United States Patent
Adamek et al.

(10) Patent No.: US 6,283,488 B1
(45) Date of Patent: Sep. 4, 2001

(54) DEVICE FOR STABILIZING THE LOWER STEERING ARMS OF A TRACTOR

(75) Inventors: Wolfgang Adamek, Lohmar; Herbert Coenen, Königswinter; Jürgen Vollmer, Lohmar, all of (DE)

(73) Assignee: GKN Walterscheid GmbH, Lohmar (DE)

( * ) Notice: Subject to any disclaimer, the term of this patent is extended or adjusted under 35 U.S.C. 154(b) by 0 days.

(21) Appl. No.: 09/168,911

(22) Filed: Oct. 8, 1998

(30) Foreign Application Priority Data

Oct. 8, 1997 (DE) .............................. 197 44 327

(51) Int. Cl.⁷ ...................................... B60D 1/01
(52) U.S. Cl. ............................ 280/455.1; 91/32; 91/526; 172/439; 172/450
(58) Field of Search .................................... 172/450, 439, 172/446, 677, 678, 679, 680; 280/455.1; 91/32, 526; 180/403

(56) References Cited

U.S. PATENT DOCUMENTS

| | | | |
|---|---|---|---|
| 2,771,306 | * 11/1956 | Ash | 172/679 |
| 3,478,647 | * 11/1969 | Gerber et al. | 91/526 |
| 3,512,453 | * 5/1970 | Balzer | 91/526 |
| 3,635,020 | * 1/1972 | Mahlmann | 60/51 |
| 3,705,631 | * 12/1972 | Seaberg | 91/526 |
| 3,877,345 | * 4/1975 | Ohms et al. | 91/412 |
| 4,330,008 | * 5/1982 | Skelly | 91/32 |
| 4,341,149 | * 7/1982 | Dezelan | 91/526 |
| 4,454,715 | * 6/1984 | Muller et al. | 60/421 |
| 4,523,886 | * 6/1985 | Reeves | 414/641 |
| 4,736,673 | * 4/1988 | Harada et al. | 91/526 |
| 4,902,030 | * 2/1990 | Andre | 280/455.1 |
| 6,035,943 | * 3/2000 | Gerein et al. | 172/677 |

FOREIGN PATENT DOCUMENTS

| | | |
|---|---|---|
| DE 31 13 915 A1 | 10/1982 | (DE) . |
| G 85 16 603.0 | 4/1986 | (DE) . |
| DE 35 27 774 A1 | 2/1987 | (DE) . |
| DE 195 37 555 A1 | 4/1997 | (DE) . |
| GB 2238455 A | 6/1991 | (GB) . |
| 3082683 * | 4/1991 | (JP) .................. 280/455.1 |

* cited by examiner

Primary Examiner—Daniel G. DePumpo
(74) Attorney, Agent, or Firm—Harness, Dickey & Pierce, P.L.C.

(57) ABSTRACT

The invention relates to a device for stabilizing the two lower steering arms (1) of a tractor. The lower steering arms (1) can be actuated by a hydraulic power lift (9). Each lower steering arm (1) is associated with a side strut (6) which includes a single-acting hydraulic cylinder (7) to stabilize and secure the lower steering arm (1). A pre-selection valve (12) and a control valve (13) enable the hydraulic cylinders to be connected to the power lift (9) either via a line or loaded separately by a second pressure source (P2). Thus, independently of the actuation of the power lift (9), the two lower steering arms can be centrally centered by the hydraulic cylinders (7).

3 Claims, 2 Drawing Sheets

… (1)

DEVICE FOR STABILIZING THE LOWER STEERING ARMS OF A TRACTOR

CROSS-REFERENCE TO RELATED APPLICATION

This application is based upon and claims priority to German Patent Application 197 44 327.3 filed Oct. 8, 1997.

BACKGROUND OF THE INVENTION

The invention relates to a device for stabilizing the two lower steering arms of a tractor. The device is actuable by a hydraulic power lift. One side strut is coupled per lower steering arm. The two steering arms are actuable by a hydraulic power lift. A switching assembly ensures that the two hydraulic cylinders of the side struts can be connected to the hydraulic power lift via a line. A connection containing means jointly disconnects the two hydraulic cylinders from the power lift. Control means establishes a connection at the point when a settable pivot position of the lower steering arms has been reached.

DE 195 37 555 A1 describes a hydraulic cylinder of the side struts pressurized in parallel with the hydraulic power lift. The hydraulic power lift adjusts the lower steering arms. This means that the lower steering arms are centered centrally as a function of the lifting force and the position. The lower steering arms are stabilized only when they are in the process of being lifted. The position switch ensures that, during the lowering process, the hydraulic cylinders of the side struts, together with the hydraulic power lift, are connected to the return flow means. In consequence, when work is carried out on a slope, the downhill forces result in the attached implement being positioned at an angle.

SUMMARY OF THE INVENTION

It is an object of the invention to develop further a device of this species which, independently of the movement of the hydraulic lift, in the sense of carrying out a lifting or lowering movement, enables the tractor operative to select a central or centered position relative to the longitudinal axis of the tractor.

In accordance with the invention, a pre-selection switch and a control valve are arranged, one behind the other, in the connection between the power lift and the two hydraulic cylinders of the side struts. The power lift is loadable by a first pressure source. The pre-selection switch additionally includes a connection for a separate power source. The control valve has at least two ports which are alternatively connectable to the two hydraulic cylinders. One of the ports is connectable to the pre-selection valve. The other of the ports is connectable to the return flow means. A separate pressure source is coupled with the pre-selection switch.

An advantage of this embodiment is that the pre-selection switch can be used either to switch the side struts or hydraulic cylinders of the side struts, in respect of power, in parallel with the pressure agent supply for the hydraulic power lift. Further, the cylinders can be supplied by an independent pressure source. The control valve is used to connect the hydraulic cylinders to the pressure source or to the return flow means.

To ensure that it is possible for the two hydraulic cylinders to be disconnected jointly from the pressure supply and from the return flow means, two embodiments are provided. According to the first embodiment, the control valve has a switching position where the two hydraulic cylinders are disconnected both from the pre-selection switch and from the return flow means. Here, a main switch is incorporated into the control line of a settable position switch for the lower steering arms to actuate the control valve. Actuation is influenced by the position switch. If the controlling power circuit of the position switch is interrupted, the control valve is actuated to assume the shut-off position.

In a further solution, a switchable shut-off valve or a variable flow control valve is incorporated into the connection between the control valve and the hydraulic cylinder. Using a variable flow control valve is additionally advantageous. Here, it is possible to set the degree of damping in respect of applying pressure to the hydraulic cylinders of the side struts. A further advantage exists in that, when lowering the lower steering arms, the reduction in pressure in the hydraulic cylinders also takes place in a dampened way. Thus, the centered position is maintained during the lowering process over a larger stroke. Furthermore, it is possible to shut off the variable flow control valve completely.

From the following detailed description, taken in conjunction with the drawings and subjoined claims, other objects and advantages of the present invention will become apparent to those skilled in the art.

DETAILED DESCRIPTION OF THE PREFERRED EMBODIMENT

Figure 1:
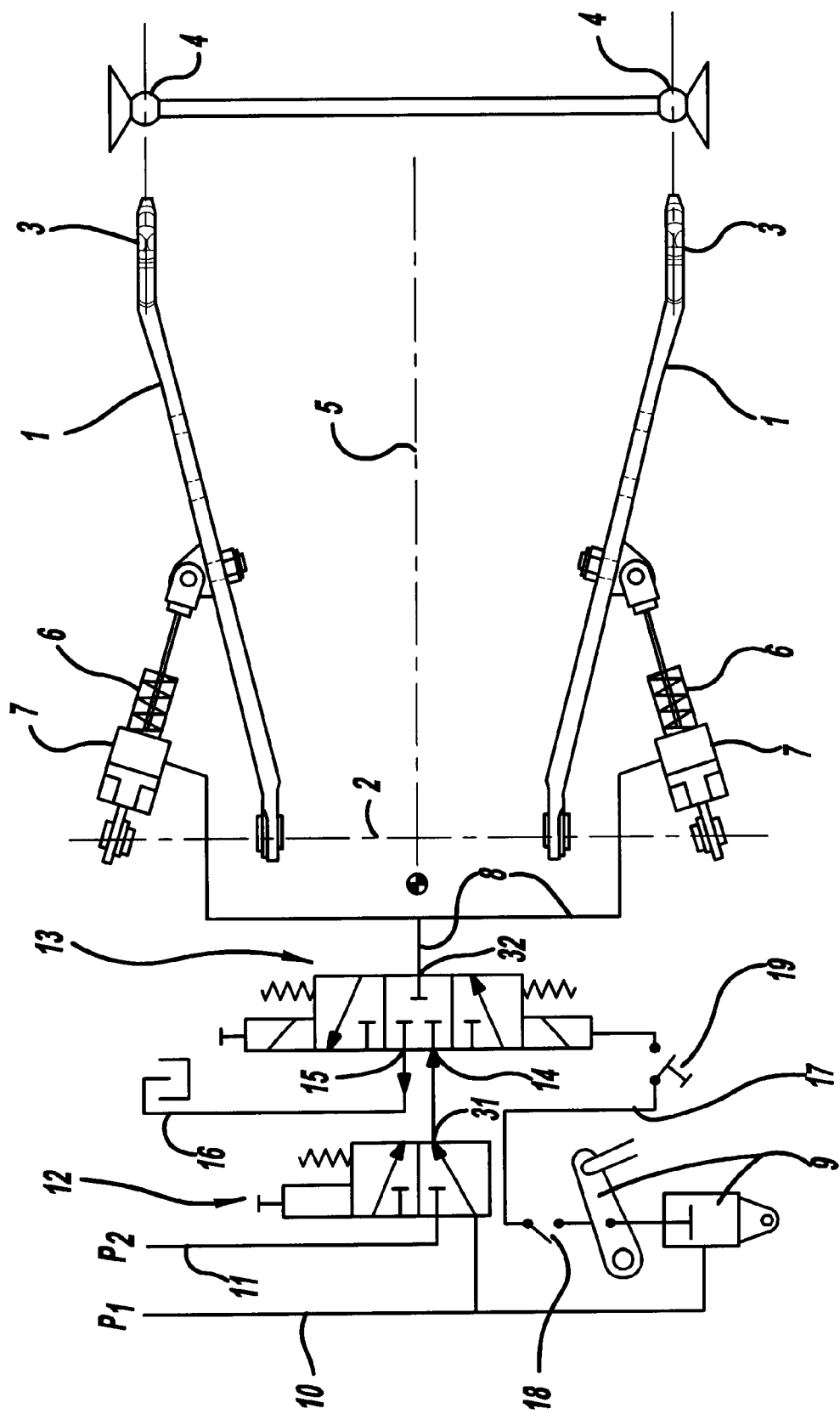
FIG. 1 is a diagrammatic view of a control valve with three switching positions in accordance with the present invention.

FIG. 1 shows two lower steering arms 1 arranged at a lateral distance from the longitudinal axis 5 of the tractor. The arms, at one end, are pivotable with respect to height around a pivot axis 2 at the tractor rear. Thus, the arms 1 may either move closer to the ground on which the tractor is standing or they move away from the ground. At the arms' other end projecting from the tractor, the lower steering arms 1 have coupling hooks 3. The coupling hooks 3 are adapted to connect to corresponding coupling means 4 of an implement (not illustrated). The implement is carried by the lower steering arms 1. To limit the lateral movement of the two lower steering arms 1, side struts 6 are provided. At one end, the side struts are connected to a lower steering arm 1. At the other end, the side struts are connected to a fixing region, which includes the pivot axis 2 arranged at the tractor.

The two side struts 6 include single-acting hydraulic cylinders 7 which are jointly connected to a connecting line 8. A hydraulic power lift 9 is included to adjust the height of the two lower steering arms 1. The power lift 9 includes two power arms (not shown). The two power arms are offset a desired distance between the lower steering arms 1. The two power arms are pivotable around a joint axis. Each power arm carries a lifting strut which is connected to the respective lower steering arm 1.

The power lift 9 includes a hydraulic cylinder to actuate the power arm. The hydraulic cylinder is supplied by a pressure source P1 through a first pressure line 10. The first pressure line 10 leads to a pre-selection valve 12. The valve 12 has a second port for a second pressure source P2. The second pressure source P2 is connected to the switching valve 12 by a second pressure line 11. In the switching position as illustrated, the pre-selection switch 12 is switched such that it connects the first pressure line 10 to its output port. The second pressure line 11 is shut off. In a second switching position, the second pressure line 11 is connected to the output port. Here, the first pressure line 10 is shut off.

The outlet port 31 of the pre-selection valve 12 leads to a first port 14 of a control valve 13. The control valve 13 has a second output port 15 which is connected to the return flow means 16. The control valve 13 has an outlet port 32. The outlet port 32, via the connecting line 8, is connectable to the two hydraulic cylinders 7. The control valve 13 can assume three switching positions. In the basic position as illustrated, all ports 14,15,32 are shut off. Here, the two first ports 14, 15 are disconnected from the connecting line 8. As far as the second switching position is concerned, the first port 14 is connected to the connecting line 8 and the second port 15, leading to the return flow means 16, is shut off. In the third switching position, the first port 14 is shut off and the connecting line 8 is connected to the second port 15 which leads to the return flow means 16.

The power lift 9 is associated with a position switch 18. The position switch 18 actuates the control valve 13 via a control line 17. A main switch 19 is incorporated into the control line 17. For the first mode of operation where both the power lift 9 and the hydraulic cylinder 7 are supplied by the pressure source P1, the pre-selection valve 12 is in the position as drawn, which is the preferential position. This means that a connection is made between the port 14 and the first pressure line 10. Equally, the hydraulic power lift 9 is supplied via the first pressure line 10. However, in the position as illustrated, the control valve 13 is in the shut-off position. This means that if the switch (not illustrated) for the power lift 9 is actuated, only the lower steering arms 1 are actuated by the power lift 9.

If the main switch 19 is closed and the power lift 9 actuated, a position is reached with the lower steering arms 1 where the position switch 18 is closed. Here, the control line 17 emits a control pulse. The pulse causes the control valve 13 to assume a position where, via the first port 14, a connection is made between the first pressure line 10 and the connecting line 8. Thus, the hydraulic cylinders 7 are also pressure-loaded. Accordingly, the lower steering arms 1 are prevented from carrying out a lateral movement. Thus, the arms cannot change from their lateral distance from the longitudinal axis 5 of the tractor.

The arms are set symmetrically relative to the axis. If the power lift 9 is disconnected from the pressure source P1 and connected to the return flow means 16, and as soon as the set height is recorded by the position switch 18, at which height switching-over takes place, the control valve 13 is caused to assume a changed switching position. Switching is effected by shutting off the connection with the first port 14 and thus with the first pressure line 10. A connection is made between the second port 15, which leads to the return flow means 16, and the connecting line 8 which leads to the hydraulic cylinders 7. Thus, the hydraulic cylinders 7 are released, with pressure agent for the return flow means 16 being able to pass the control valve 13. In this position, the two hydraulic cylinders 7 enable lateral pendulum movements of the lower steering arms 1 relative to the longitudinal axis 5 of the tractor.

If, after pressurization takes place, the two hydraulic cylinders continue to remain in position where they center the lower steering arms 1, after the second one of the described positions has been assumed, connection between the first pressure line 10, via the first port 14, with the connecting line 8, enables the control valve 13 to be transferred into the shut-off position as shown. This occurs by opening the main switch 19.

In the extended position, the two hydraulic cylinders 7 are disconnected from the pressure agent supply source. Accordingly, the lower steering arms 1 remain centered. If it is necessary for the power lift 9 to adjust the height of the two lower steering arms 1 and for both of the two hydraulic cylinders 7 to be switchable independently of the power lift 9, the pre-selection valve 12 is switched such that the connection with the first pressure line is shut off. Also, the connection with the second pressure line 11 is opened. Thus, the outlet port of the pre-selection switch 12 is connected to the first port 14 of the control valve 13. Here, it is possible to load, for example, the two pressure cylinders 7 with a pressure agent independently of the operation of actuating the power lift 9. Thus, the control valve 13 is manually transferred into a position where the first port 14 is connected to the connecting line 8.

Figure 2:
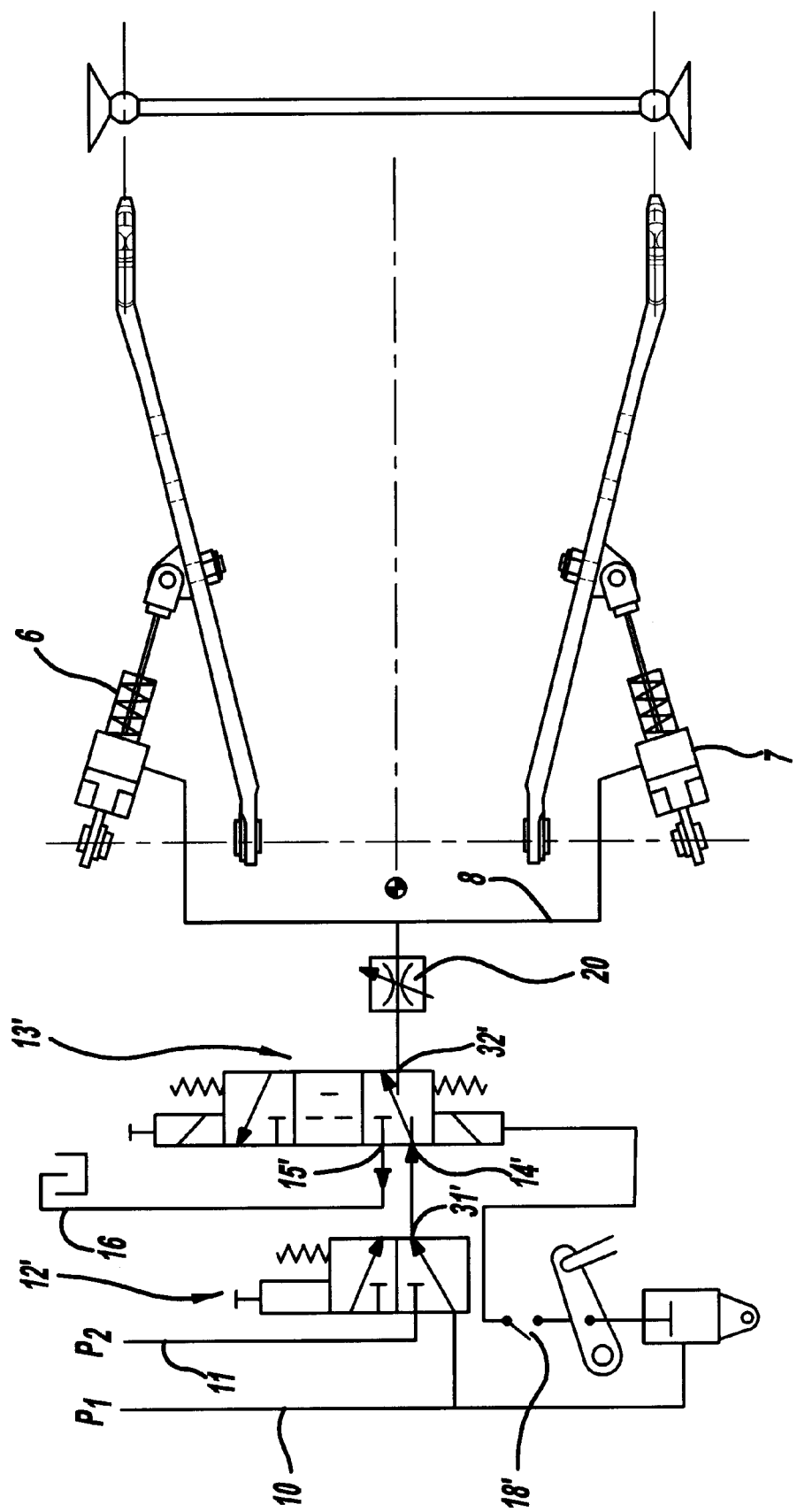
FIG. 2 is a diagrammatic view of a modified embodiment with a control valve only having two functions and a variable flow control valve in accordance with the present invention.

FIG. 2 shows an embodiment modified with respect to FIG. 1. The control valve 13' can only be transferred into two switching positions. In one switching position, the first port 14' is switched open towards the connecting line 8. Here, the second port 15' is shut off. In the second position, the second port 15' leading to the return flow means 16 can be short-circuited relative to the connecting line 8. However, the control valve 13', directly at its output port, is associated with a variable flow control valve 20.

The variable control valve at the output port is connected to the hydraulic cylinders 7. The variable flow control valve 20 can be used to dampen the exchange of pressure agent between the two ports 14' and 15', respectively, and the connecting line 8. However, the variable flow control valve 20 can also be used to prevent the connection with the control valve 13'. Thus, the two pressure-loaded hydraulic cylinders 7 are completely disconnected from the further supply of pressure.

This embodiment does not include a main switch since the interruption in the supply of pressure agent, a shut-off position, can be effected entirely by actuating the variable flow control valve 20. This means that the control line 17' directly connects the position switch 18' with the means for actuating the control valve 13'. The remaining components of the inventive design according to FIG. 2 are identical in design to those illustrated in FIG. 1. The design and functions of the pre-selection switch 12' correspond to those shown in FIG. 1.

While the above detailed description describes the preferred embodiment of the present invention, the invention is susceptible to modification, variation and alteration without deviating from the scope and fair meaning of the subjoined claims.

What is claimed is:

1. A control device in combination with two lower steering arms of a tractor, a hydraulic power lift for lifting or lowering the two lower steering arms, each lower steering arm actuable by one side strut, each side strut having a hydraulic cylinder, said hydraulic power lift connected to a first pressure source and said control device comprising:

a second pressure source;

a switchable pre-selection valve; and a switchable control valve;

said pre-selection valve having a first port connected to the first pressure source, a second port connected to the second pressure source and an outlet port connected to an inlet port of the control valve, and said pre-selection valve switchable to connect either the first pressure source or the second pressure source to the inlet port of the control valve;

said control valve switchable to a first position jointly connecting the two hydraulic cylinders to the inlet port and to a second position jointly connecting the two cylinders to a return flow means wherein said two hydraulic cylinders enable the two lower steering arms of the tractor to float sideways.

2. A device according to claim 1, wherein the control valve including a switching position where the two hydraulic cylinders are disconnected from both the pre-selection valve and from the return flow means, and a main switch coupled with a control line between a settable second position switch for the lower steering arms and actuating means for the control valve, said actuation being influenced by said settable position switch.

3. A device according to claim 1, wherein a connecting line between the control valve and the hydraulic cylinders includes a switchable shut-off valve or a variable flow control valve.

* * * * *